(No Model.)

P. GENDRON.
GUN CARRIER FOR BICYCLES.

No. 503,315. Patented Aug. 15, 1893.

Witnesses
A. L. Hobbie
M. B. Dougherty

Inventor
Peter Gendron
By Mo. Sprague & Co.
Attys.

UNITED STATES PATENT OFFICE.

PETER GENDRON, OF TOLEDO, OHIO.

GUN-CARRIER FOR BICYCLES.

SPECIFICATION forming part of Letters Patent No. 503,315, dated August 15, 1893.

Application filed February 11, 1893. Serial No. 461,919. (No model.)

*To all whom it may concern:*

Be it known that I, PETER GENDRON, a citizen of the United States, residing at Toledo, in the county of Lucas and State of Ohio, have invented certain new and useful Improvements in Gun-Carriers for Bicycles, of which the following is a specification, reference being had therein to the accompanying drawings.

The invention consists in the peculiar construction of a support or carrier by which a gun may be readily carried on a bicycle without detriment to the rider in propelling and yet which enables the rider to detach the gun without difficulty and to replace it with equal facility.

Figure 1:
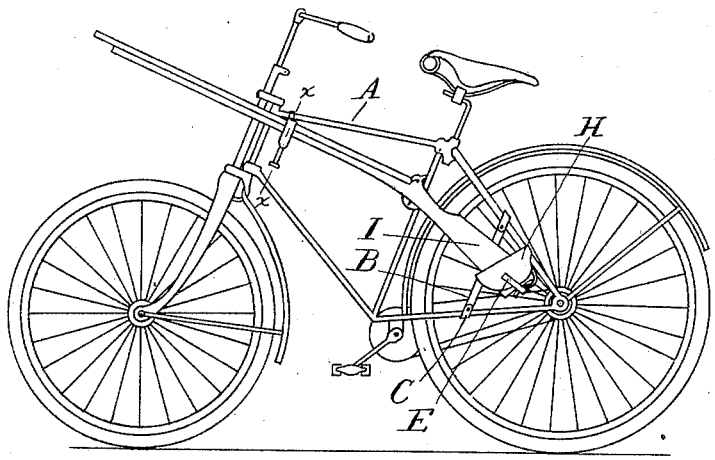
Figure 3:
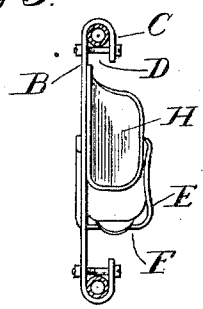
Figure 4:
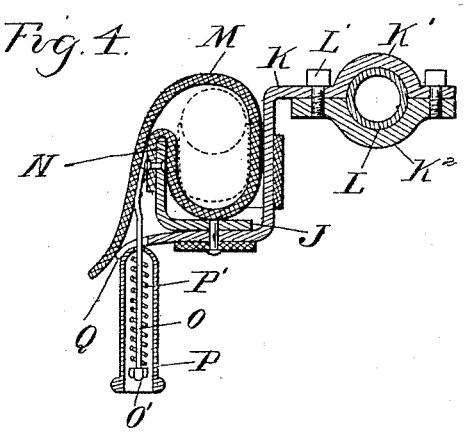
Figure 2:
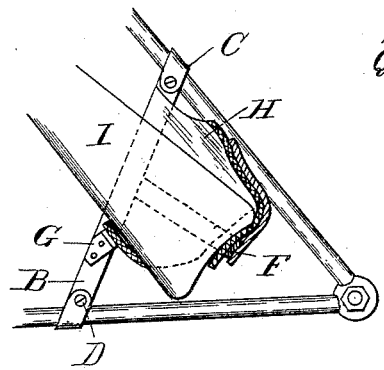

In the drawings, Figure 1 is a side elevation of a bicycle showing a gun carried in my improved support. Fig. 2 is an enlarged section through the rear socket. Fig. 3 is a front elevation thereof and Fig. 4 is a cross section on line $x\ x$ in Fig. 1.

A is a bicycle of any ordinary construction.

B is a bar supported on the frame near the rear wheel preferably by forming bends C at each end, adapted to embrace the frame of the bicycle and clamped thereon by means of clamping bolts D.

E is a hooked shaped bar extending rearwardly and downwardly from the bar B and having the bent cross bar F at its lower end.

G is an angle bracket extending outward from the face of the bar B and H is a leather pocket supported on this frame work, of suitable shape to receive the stock I of the gun, the main weight of which will rest upon the curved cross-bar F and the bracket G. The gun extends forward and upward and the barrel rests in a U-shaped bracket J formed on the end of the bar K, which has a semicircular bar K', forming half of the clamp, the other half being formed by a clip plate $K^2$ and both being clamped upon the backbone L of the bicycle, by means of clamping bolts L'.

M is a strap secured at one end to the outer end N of the bracket J and passing down inside of that bracket in the shape of a loop, and having secured to its free end a spring clamp of any suitable construction. That which I show consists of a rod O secured at its upper end to near the end of the strap, and at its lower end provided with a nut O', a spring casing P slidingly engaging over this rod and a spring P' sleeved upon the rod and bearing at one end against the upper end of the casing P and at the lower end against the nut O'. The stock of the gun being inserted in the U-shaped bracket, as shown in Fig. 1, the operator tightly draws the strap over the barrel engaging the rod O into the forked bearing Q which extends from the under side of the bracket J, drawing down on the casing P, compressing the spring P' until that casing passes beneath the forked bearing. When he lets go his hold it will engage with said bearing and tightly hold the barrel in position. The end of the forked bearing Q is preferably bent to prevent the accidental disengagement of the spring clamp.

If desired a suitable support for the bicycle may be employed to hold it in its vertical position when the rider has dismounted and combined therewith a device for holding the brake applied to the wheel may also be used. These I do not herein claim.

What I claim as my invention is—

1. In a bicycle, the combination with a gun-barrel support, of a stock support consisting of a cross bar secured to the rear frame, a hook shaped bar extending rearwardly and downwardly from said bar and having a bent bar at its lower end, an angle bracket on the cross bar and a leather pocket adapted to receive the gun stock secured to said angle bracket and hook shaped bar, substantially as described.

2. In a bicycle, the combination with a gun support, of a barrel support consisting of a U-shaped bracket having an offset clamped to the back bone of the bicycle, a flexible portion secured to the bracket and adapted to encircle the gun barrel, a catch on the bracket, a clamp on the free end of the flexible portion adapted to engage the catch, substantially as described.

3. In a bicycle, the combination with a gun support, of a barrel support consisting of a U-shaped bracket clamped to the back bone of the bicycle, a flexible portion secured to the bracket adapted to encircle the gun barrel, a catch on the bracket and a spring clamp on the free end of the flexible portion adapted to engage the catch consisting of a rod, a nut on the end of the rod, a casing on the rod, and a spring sleeved on the rod having its ends respectively bearing against the casing and nut, substantially as described.

4. In a bicycle the combination with the frame thereof, of a gun barrel support at the forward end of the frame, a bar connected to and extending across the rear of the frame, a lateral support on the bar and a pocket for a gun stock carried by the bar above the support, substantially as described.

In testimony whereof I affix my signature in presence of two witnesses.

PETER GENDRON.

Witnesses:
M. B. O'DOGHERTY,
N. L. LINDOP.